United States Patent
Zhang et al.

(10) Patent No.: US 10,986,599 B2
(45) Date of Patent: Apr. 20, 2021

(54) TA OBTAINING METHOD AND APPARATUS

(71) Applicant: HUAWEI TECHNOLOGIES CO., LTD., Guangdong (CN)

(72) Inventors: Lili Zhang, Beijing (CN); Kai Xu, Shenzhen (CN); Xiaocui Li, Beijing (CN); Nathan Edward Tenny, San Diego, CA (US); Bin Liu, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 338 days.

(21) Appl. No.: 16/301,405

(22) PCT Filed: May 13, 2016

(86) PCT No.: PCT/CN2016/082155
§ 371 (c)(1),
(2) Date: Nov. 13, 2018

(87) PCT Pub. No.: WO2017/193410
PCT Pub. Date: Nov. 16, 2017

(65) Prior Publication Data
US 2020/0322912 A1  Oct. 8, 2020

(51) Int. Cl.
*H04J 3/06* (2006.01)
*H04W 56/00* (2009.01)
*H04L 5/00* (2006.01)

(52) U.S. Cl.
CPC ..... *H04W 56/0045* (2013.01); *H04W 56/001* (2013.01); *H04W 56/0005* (2013.01); *H04L 5/0007* (2013.01)

(58) Field of Classification Search
CPC ......... H04W 56/0045; H04W 56/0005; H04W 56/001; H04W 72/042; H04W 74/0833; H04W 72/0406; H04L 5/0007
(Continued)

(56) References Cited

U.S. PATENT DOCUMENTS

2008/0267131 A1* 10/2008 Kangude ........... H04W 36/0072
370/331
2012/0087270 A1*  4/2012 Wan ................. H04W 56/0045
370/252
(Continued)

FOREIGN PATENT DOCUMENTS

CN         101370267 A     2/2009
CN         101646234 A     2/2010
(Continued)

OTHER PUBLICATIONS

Extended European Search Report issued in European Application No. 16901365.3 dated Apr. 10, 2019, 7 pages.
(Continued)

*Primary Examiner* — Mahendra R Patel
(74) *Attorney, Agent, or Firm* — Fish & Richardson P.C.

(57) ABSTRACT

Embodiments of the present disclosure provide timing advance (TA) obtaining methods and apparatuses. One example method includes generating, by a base station, an indication message and sending the indication message to UE, and receiving, by the UE, the indication message sent by the base station. The UE can then obtain a TA of a second carrier based on the indication message, where the second carrier is a carrier not used to transmit a PUSCH. Although the second carrier is a carrier not used to transmit a PUSCH, the TA of the second carrier can still be obtained.

16 Claims, 6 Drawing Sheets

(58) Field of Classification Search
USPC .......................................................... 370/350
See application file for complete search history.

(56) References Cited

U.S. PATENT DOCUMENTS

| | | | | |
|---|---|---|---|---|
| 2013/0028204 | A1* | 1/2013 | Dinan | H04L 5/0098 370/329 |
| 2013/0064165 | A1* | 3/2013 | Chen | H04W 56/0045 370/312 |
| 2013/0188580 | A1* | 7/2013 | Dinan | H04W 74/085 370/329 |
| 2013/0188620 | A1* | 7/2013 | Dinan | H04W 28/18 370/336 |
| 2013/0223360 | A1* | 8/2013 | Tabet | G06F 17/141 370/329 |
| 2014/0211738 | A1* | 7/2014 | Park | H04W 52/18 370/329 |
| 2014/0321389 | A1* | 10/2014 | Zhang | H04W 74/0841 370/329 |
| 2015/0063245 | A1* | 3/2015 | Gao | H04W 52/346 370/329 |
| 2015/0103811 | A1* | 4/2015 | Marinier | H04W 56/0005 370/336 |
| 2015/0181546 | A1* | 6/2015 | Freda | H04L 27/0014 370/336 |
| 2015/0189675 | A1* | 7/2015 | Feuersaenger | H04W 52/327 370/329 |
| 2015/0334699 | A1* | 11/2015 | Uchino | H04L 5/0053 370/329 |
| 2016/0173248 | A1* | 6/2016 | Kerhuel | H04L 25/0226 370/328 |
| 2016/0269163 | A1 | 9/2016 | Wong et al. | |
| 2016/0330676 | A1* | 11/2016 | Thangarasa | H04W 76/14 |
| 2017/0238190 | A1* | 8/2017 | Yang | H04L 5/0048 370/329 |
| 2017/0339660 | A1* | 11/2017 | Kazmi | H04B 17/309 |
| 2019/0028980 | A1 | 1/2019 | Feuersaenger et al. | |

FOREIGN PATENT DOCUMENTS

| | | | | |
|---|---|---|---|---|
| CN | 102318233 | A | | 1/2012 |
| CN | 102932917 | A | | 2/2013 |
| CN | 103200663 | A | | 7/2013 |
| CN | 103428786 | A | | 12/2013 |
| JP | 2013042258 | A | | 2/2013 |
| JP | 2013516917 | A | | 5/2013 |
| JP | 2014526834 | A | | 10/2014 |
| JP | 2016539559 | A | | 12/2016 |
| KR | 20130024895 | A | * | 3/2013 .......... H04W 52/327 |
| KR | 20130024895 | A | | 3/2013 |
| WO | 2011120716 | A1 | | 10/2011 |
| WO | 2015063593 | A2 | | 5/2015 |
| WO | WO-2015063593 | A2 | * | 5/2015 .......... H04W 72/042 |

OTHER PUBLICATIONS

R2-154344—Huawei, HiSilicon,"Support for SRS switching among TDD Scells,"3GPP TSG-RAN WG2 Meeting #91bis, Malmo, Sweden, Oct. 5-9, 2015, 5 pages.
R1-112301—Renesas Mobile Europe Ltd., "Discussion on TDOA based TA calculation scheme," 3GPP TSG-RAN WG1 Meeting #66, Athens, Greece, Aug. 22-26, 2011, 4 pages.
R1-163055—Qualcomm Incorporated,"Specification impact of supporting SRS switching," 3GPP TSG RAN WG1 Meeting #84bis, Busan, Korea Apr. 11-15, 2016, 2 pages.
Office Action issued in Japanese Application No. 2018-560029 dated Dec. 16, 2019, 15 pages (with English translation).
3GPP TS 36.300 V13.3.0 (Mar. 2016),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13), Mar. 2016. total 295 pages.
3GPP TS 36.321 V13.1.0 (Mar. 2016), 3rd Generation Partnership Project;Technical Specification Group Radio Access Network;Evolved Universal Terrestrial Radio Access (E-UTRA);Medium Access Control (MAC) protocol specification(Release 13), Mar. 2016. total 85 pages.
3GPP TS 36.331 V13.1.0 (Mar. 2016), 3rd Generation Partnership Project;Technical Specification Group Radio Access Network;Evolved Universal Terrestrial Radio Access (E-UTRA);Radio Resource Control (RRC);Protocol specification(Release 13), Mar. 2016. total 85 pages.
International Search Report and Written Opinion issued in International Application No. PCT/CN2016/082155 dated Jan. 25, 2017, 19 pages.
Office action issued in Korean Application No. 10-2018-7036048 dated Dec. 20, 2019, 5 pages (With English Translation).
Nokia et al.,"Discussion on SRS carrier based switching",R1-163166 3GPP TSG-RAN WG1 Meeting #84bis,Busan, Korea Apr. 11-15, 2016, 3 pages.
Office Action issued in Chinese application No. 201680029324.5 dated Jun. 21, 2019, 19 pages (With English Translation).

* cited by examiner

TA OBTAINING METHOD AND APPARATUS

CROSS-REFERENCE TO RELATED APPLICATIONS

This application is a national stage of International Application No. PCT/CN2016/082155, filed on May 13, 2016, which is hereby incorporated by reference in its entirety.

TECHNICAL FIELD

Embodiments of the present invention relate to the field of communications technologies, and in particular, to a carrier timing advance (Timing Advance, TA for short) obtaining method and apparatus.

BACKGROUND

A Long Term Evolution-Advanced (Long Term Evolution-Advanced, LTE-A for short) system is an evolved Long Term Evolution (Long Term Evolution, LTE for short) system, and aims to satisfy higher requirements and more applications of a wireless communication market and satisfy requirements of International Mobile Telecommunications-Advanced (International Mobile Telecommunications-Advanced, IMT-Advanced for short). A carrier aggregation (Carrier Aggregation, CA for short) technology is used in LTE-A to improve a data transmission rate. Specifically, a base station supporting carrier aggregation may aggregate a plurality of carriers (Component Carrier, CC for short) to provide a service to user equipment (User Equipment, UE for short). In this way, the UE can send data and/or receive data by simultaneously using a plurality of CCs, thereby improving a data transmission rate. In addition, in the LTE-A system, to ensure orthogonality between uplink signals of UEs, it needs to be ensured that clocks of the uplink signals sent by the UEs are consistent at a receive end of a base station side. Therefore, before sending an uplink signal by using a CC, UE needs to obtain a TA based on which the UE sends the uplink signal on the CC. In this way, the UE may send the uplink signal on the CC based on the TA of the CC, to avoid a problem that a clock of an uplink signal is inconsistent at the receive end of the base station side because of a transmission delay of the uplink signal in a sending process. For example, the UE sends a sounding reference signal (sounding reference signal, SRS for short) on the CC based on the TA of the CC. In this way, the base station can listen and obtain the SRS within a preset time.

In the prior art, UE performs random access to obtain a TA based on which the UE sends an uplink signal on a CC. For example, the UE obtains a physical random access channel (Physical Random Access Channel, PRACH for short) configuration message of the CC. The PRACH configuration message includes information about a preamble, information about the CC used to send the preamble, and a time at which the preamble is sent. Then, the UE sends the preamble to a base station at a specified time based on the PRACH configuration message by using the CC, to perform random access. After receiving the preamble sent by the UE, the base station replies to the UE with a random access response (Random Access Response, RAR for short). The RAR includes TA information of the CC. In this way, the UE may send the uplink signal on the CC based on the TA of the CC, to ensure that a clock of the uplink signal sent by the UE by using the CC is consistent at a receive end of a base station side.

However, if a CC corresponding to the UE is a CC not used to transmit a PUSCH, that is, random access cannot be performed on the CC, a TA based on which the UE sends an uplink signal on the CC cannot be obtained by using the prior art. As a result, when carrier switching is supported, that is, the CC can be used to transmit uplink data after carrier switching, the UE still cannot transmit uplink data by using the CC.

SUMMARY

Embodiments of the present invention provide a TA obtaining method and apparatus, to resolve a prior-art problem that if a CC corresponding to UE is a CC not used to transmit a PUSCH, that is, random access cannot be performed on the CC, a TA based on which the UE sends an uplink signal on the CC cannot be obtained.

According to a first aspect, an embodiment of the present invention provides a TA obtaining method, including:
receiving an indication message sent by a base station; and
obtaining a timing advance TA of a second carrier based on the indication message, where the second carrier is a carrier not used to transmit a PUSCH.

The TA obtaining method provided in the first aspect includes: generating, by the base station, the indication message and sending the indication message to UE, and receiving, by the UE, the indication message sent by the base station and obtaining the timing advance TA of the second carrier based on the indication message, where the second carrier is a carrier not used to transmit a PUSCH. In this way, although the second carrier is a carrier not used to transmit a PUSCH, the TA of the second carrier can still be obtained.

Optionally, in a possible implementation of the first aspect, the method further includes: switching from a first carrier to the second carrier.

Optionally, in a possible implementation of the first aspect, the indication message includes a preamble and/or a resource transmission identifier that needs to be transmitted on the second carrier.

Optionally, in a possible implementation of the first aspect, the resource transmission identifier includes at least one of the following: a subframe identifier, an orthogonal frequency division multiplexing OFDM symbol location identifier, a carrier identifier, and a physical resource block identifier.

Optionally, in a possible implementation of the first aspect, the obtaining a TA of a second carrier based on the indication message includes:
sending the preamble to the base station on the second carrier.

Optionally, in a possible implementation of the first aspect, the obtaining a TA of a second carrier based on the indication message includes:
receiving a response message sent by the base station, where the response information includes the TA of the second carrier and/or a random access power offset.

Optionally, in a possible implementation of the first aspect, the TA is determined by the base station based on receiving information about the preamble.

Optionally, in a possible implementation of the first aspect, the indication message includes: a synchronization signal and/or a synchronization difference between base stations.

Optionally, in a possible implementation of the first aspect, the obtaining a TA of a second carrier based on the indication message includes:

determining a first receiving time of the synchronization signal sent by using the third carrier, and determining a second receiving time of the synchronization signal sent by using the second carrier.

Optionally, in a possible implementation of the first aspect, the obtaining a TA of a second carrier based on the indication message includes:

determining the TA of the second carrier based on a difference between the second receiving time and the first receiving time, and a TA of the third carrier.

Optionally, in a possible implementation of the first aspect, the TA of the second carrier is a downlink TA.

Optionally, in a possible implementation of the first aspect, the downlink TA is used as an uplink TA based on which an uplink signal is sent on the second carrier.

Optionally, in a possible implementation of the first aspect, the indication message includes: a synchronization signal and/or a synchronization difference between base stations.

Optionally, in a possible implementation of the first aspect, the obtaining a TA of a second carrier based on the indication message includes:

determining a first receiving time of the synchronization signal sent by using the third carrier, and determining a second receiving time of the synchronization signal sent by using the second carrier.

Optionally, in a possible implementation of the first aspect, the obtaining a TA of a second carrier based on the indication message includes:

determining the TA of the second carrier based on a difference between the second receiving time and the first receiving time, the synchronization difference between the base stations, and a TA of the third carrier.

Optionally, in a possible implementation of the first aspect, the third carrier and the first carrier are same carriers.

Optionally, in a possible implementation of the first aspect, the first carrier and the second carrier are in different timing advance groups TAGs.

Optionally, in a possible implementation of the first aspect, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

Optionally, in a possible implementation of the first aspect, the receiving an indication message sent by a base station includes:

receiving the indication message sent by using the second carrier.

Optionally, in a possible implementation of the first aspect, the receiving a response message sent by the base station includes:

receiving the response message sent by the base station by using the second carrier.

Optionally, in a possible implementation of the first aspect, the indication message further includes: a number of a fourth carrier or a number of the first carrier.

Optionally, in a possible implementation of the first aspect, the receiving a response message sent by the base station includes:

receiving, on the fourth carrier or the first carrier, the response message sent by the base station.

Optionally, in a possible implementation of the first aspect, the indication information is Radio Resource Control RRC signaling or physical layer signaling.

Optionally, in a possible implementation of the first aspect, the obtaining a TA of a second carrier based on the indication message includes:

receiving a physical downlink control channel PDCCH command sent by the base station.

Optionally, in a possible implementation of the first aspect, the obtaining a TA of a second carrier based on the indication message includes:

receiving a response message sent by the base station, where the response information includes a difference between the TA of the second carrier and a TA of the first carrier.

Optionally, in a possible implementation of the first aspect, the obtaining a TA of a second carrier based on the indication message includes:

determining the TA of the second carrier based on the difference between the TA of the second carrier and the TA of the first carrier, and the TA of the first carrier.

Optionally, in a possible implementation of the first aspect, the indication message further includes: type information of the response message and/or information about a time segment of the response message.

Optionally, in a possible implementation of the first aspect, the receiving a response message sent by the base station includes:

receiving, in the time segment, the response message sent by the base station.

Optionally, in a possible implementation of the first aspect, the receiving a response message sent by the base station includes:

parsing the response message based on the type information of the response message.

According to a second aspect, an embodiment of the present invention provides a TA obtaining method, including:

determining whether a second carrier and a third carrier belong to a same timing advance group TAG, where the second carrier is a carrier not used to transmit a PUSCH; and if yes, determining that a TA of the second carrier is the same as that of the third carrier.

The TA obtaining method provided in the second aspect includes: determining whether the second carrier and the third carrier belong to a same timing advance group TAG, where the second carrier is a carrier not used to transmit a PUSCH; and if yes, determining that the TA of the second carrier is the same as the TA of the third carrier. In this way, although the second carrier is a carrier not used to transmit a PUSCH, the TA of the second carrier can still be obtained.

Optionally, in a possible implementation of the second aspect, the method further includes:

sending an uplink signal on the second carrier based on the TA of the second carrier.

Optionally, in a possible implementation of the second aspect, the uplink signal is a sounding reference signal SRS.

Optionally, in a possible implementation of the second aspect, the method further includes:

switching from a first carrier to the second carrier.

Optionally, in a possible implementation of the second aspect, the third carrier and the first carrier are same carriers.

Optionally, in a possible implementation of the second aspect, the third carrier is different from the first carrier, and the third carrier is an uplink carrier.

According to a third aspect, an embodiment of the present invention provides a TA obtaining method, including:

generating an indication message, where the indication message is used to instruct user equipment UE to obtain a timing advance TA; and sending the indication message to the UE.

Optionally, in a possible implementation of the third aspect, the indication message includes a preamble and/or a resource transmission identifier that needs to be transmitted on the second carrier.

Optionally, in a possible implementation of the third aspect, the resource transmission identifier includes at least one of the following: a subframe identifier, an orthogonal frequency division multiplexing OFDM symbol location identifier, a carrier identifier, and a physical resource block identifier.

Optionally, in a possible implementation of the third aspect, the method further includes:

receiving the preamble sent by the UE on the second carrier.

Optionally, in a possible implementation of the third aspect, the method further includes:

sending a response message to the UE, where the response information includes the TA of the second carrier and/or a random access power offset.

Optionally, in a possible implementation of the third aspect, the method further includes:

determining the TA based on receiving information about the preamble.

Optionally, in a possible implementation of the third aspect, the indication message includes: a synchronization signal and/or a synchronization difference between base stations.

Optionally, in a possible implementation of the third aspect, the method further includes:

sending the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, and a TA of the third carrier.

Optionally, in a possible implementation of the third aspect, the method further includes:

sending the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, the synchronization difference between the base stations, and a TA of the third carrier.

Optionally, in a possible implementation of the third aspect, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

Optionally, in a possible implementation of the third aspect, the method further includes:

sending the indication message to the UE by using the second carrier.

Optionally, in a possible implementation of the third aspect, the method further includes:

sending the response message to the UE by using the second carrier.

Optionally, in a possible implementation of the third aspect, the indication message further includes: a number of a fourth carrier or a number of a first carrier.

Optionally, in a possible implementation of the third aspect, the method further includes:

sending the response message to the UE by using the fourth carrier or the first carrier.

Optionally, in a possible implementation of the third aspect, the indication information is Radio Resource Control RRC signaling or physical layer signaling.

Optionally, in a possible implementation of the third aspect, the method further includes:

sending a physical downlink control channel PDCCH command to the UE.

Optionally, in a possible implementation of the third aspect, the method further includes:

sending a response message to the UE, so that the UE determines the TA of the second carrier based on a difference between the TA of the second carrier and a TA of a first carrier, and the TA of the first carrier, where the response information includes the difference between the TA of the second carrier and the TA of the first carrier.

Optionally, in a possible implementation of the third aspect, the indication message further includes: type information of the response message and/or information about a time segment of the response message.

Optionally, in a possible implementation of the third aspect, the method further includes:

sending the response message to the UE, so that the UE receives the response message in the time segment.

Optionally, in a possible implementation of the third aspect, the method further includes: sending the response message to the UE, so that the UE parses the response message based on the type information of the response message.

For beneficial effects of the TA obtaining method provided in the third aspect and the possible implementations of the third aspect, refer to beneficial effects of the first aspect and the possible implementations of the first aspect. Details are not described herein again.

According to a fourth aspect, an embodiment of the present invention provides a TA obtaining apparatus, including:

a receiver, configured to receive an indication message sent by a base station; and a processor, configured to obtain a timing advance TA of a second carrier based on the indication message, where the second carrier is a carrier not used to transmit a PUSCH.

Optionally, in a possible implementation of the fourth aspect, the apparatus further includes:

a switcher, configured to switch from a first carrier to the second carrier.

Optionally, in a possible implementation of the fourth aspect, the indication message includes a preamble and/or a resource transmission identifier that needs to be transmitted on the second carrier.

Optionally, in a possible implementation of the fourth aspect, the resource transmission identifier includes at least one of the following: a subframe identifier, an orthogonal frequency division multiplexing OFDM symbol location identifier, a carrier identifier, and a physical resource block identifier.

Optionally, in a possible implementation of the fourth aspect, the processor is specifically configured to send the preamble to the base station on the second carrier.

Optionally, in a possible implementation of the fourth aspect, the processor is specifically configured to receive a response message sent by the base station, where the response information includes the TA of the second carrier and/or a random access power offset.

Optionally, in a possible implementation of the fourth aspect, the TA is determined by the base station based on receiving information about the preamble.

Optionally, in a possible implementation of the fourth aspect, the indication message includes: a synchronization signal and/or a synchronization difference between base stations.

Optionally, in a possible implementation of the fourth aspect, the processor is specifically configured to: determine a first receiving time of the synchronization signal sent by using the third carrier, and determine a second receiving time of the synchronization signal sent by using the second carrier.

Optionally, in a possible implementation of the fourth aspect, the processor is specifically configured to determine the TA of the second carrier based on a difference between the second receiving time and the first receiving time, and a TA of the third carrier.

Optionally, in a possible implementation of the fourth aspect, the TA of the second carrier is a downlink TA.

Optionally, in a possible implementation of the fourth aspect, the downlink TA is used as an uplink TA based on which an uplink signal is sent on the second carrier.

Optionally, in a possible implementation of the fourth aspect, the indication message includes: a synchronization signal and/or a synchronization difference between base stations.

Optionally, in a possible implementation of the fourth aspect, the processor is specifically configured to: determine a first receiving time of the synchronization signal sent by using the third carrier, and determine a second receiving time of the synchronization signal sent by using the second carrier.

Optionally, in a possible implementation of the fourth aspect, the processor is specifically configured to determine the TA of the second carrier based on a difference between the second receiving time and the first receiving time, the synchronization difference between the base stations, and a TA of the third carrier.

Optionally, in a possible implementation of the fourth aspect, the third carrier and the first carrier are same carriers.

Optionally, in a possible implementation of the fourth aspect, the first carrier and the second carrier are in different timing advance groups TAGs.

Optionally, in a possible implementation of the fourth aspect, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

Optionally, in a possible implementation of the fourth aspect, the receiver is specifically configured to receive the indication message sent by using the second carrier.

Optionally, in a possible implementation of the fourth aspect, the processor is specifically configured to receive the response message sent by the base station by using the second carrier.

Optionally, in a possible implementation of the fourth aspect, the indication message further includes: a number of a fourth carrier or a number of the first carrier.

Optionally, in a possible implementation of the fourth aspect, the processor is specifically configured to receive, on the fourth carrier or the first carrier, the response message sent by the base station.

Optionally, in a possible implementation of the fourth aspect, the indication information is Radio Resource Control RRC signaling or physical layer signaling.

Optionally, in a possible implementation of the fourth aspect, the processor is specifically configured to receive a physical downlink control channel PDCCH command sent by the base station.

Optionally, in a possible implementation of the fourth aspect, the processor is specifically configured to receive a response message sent by the base station, where the response information includes a difference between the TA of the second carrier and a TA of the first carrier.

Optionally, in a possible implementation of the fourth aspect, the processor is specifically configured to determine the TA of the second carrier based on the difference between the TA of the second carrier and the TA of the first carrier, and the TA of the first carrier.

Optionally, in a possible implementation of the fourth aspect, the indication message further includes: type information of the response message and/or information about a time segment of the response message.

Optionally, in a possible implementation of the fourth aspect, the processor is specifically configured to receive, in the time segment, the response message sent by the base station.

Optionally, in a possible implementation of the fourth aspect, the processor is specifically configured to parse the response message based on the type information of the response message.

For beneficial effects of the TA obtaining apparatus provided in the fourth aspect and the possible implementations of the fourth aspect, refer to beneficial effects of the first aspect and the possible implementations of the first aspect. Details are not described herein again.

According to a fifth aspect, an embodiment of the present invention provides a TA obtaining apparatus, including:

a processor, configured to determine whether a second carrier and a third carrier belong to a same timing advance group TAG, where the second carrier is a carrier not used to transmit a PUSCH, and if yes, the processor is further configured to determine that a TA of the second carrier is the same as that of the third carrier.

Optionally, in a possible implementation of the fifth aspect, the apparatus further includes:

a transmitter, configured to send an uplink signal on the second carrier based on the TA of the second carrier.

Optionally, in a possible implementation of the fifth aspect, the uplink signal is a sounding reference signal SRS.

Optionally, in a possible implementation of the fifth aspect, the apparatus further includes:

a switcher, configured to switch from a first carrier to the second carrier.

Optionally, in a possible implementation of the fifth aspect, the third carrier and the first carrier are same carriers.

Optionally, in a possible implementation of the fifth aspect, the third carrier is different from the first carrier, and the third carrier is an uplink carrier.

For beneficial effects of the TA obtaining apparatus provided in the fifth aspect and the possible implementations of the fifth aspect, refer to beneficial effects of the second aspect and the possible implementations of the second aspect. Details are not described herein again.

According to a sixth aspect, an embodiment of the present invention provides a TA obtaining apparatus, including:

a processor, configured to generate an indication message, where the indication message is used to instruct user equipment UE to obtain a timing advance TA; and a transmitter, configured to send the indication message to the UE.

Optionally, in a possible implementation of the sixth aspect, the indication message includes a preamble and/or a resource transmission identifier that needs to be transmitted on the second carrier.

Optionally, in a possible implementation of the sixth aspect, the resource transmission identifier includes at least one of the following: a subframe identifier, an orthogonal frequency division multiplexing OFDM symbol location identifier, a carrier identifier, and a physical resource block identifier.

Optionally, in a possible implementation of the sixth aspect, the apparatus further includes:

a receiver, configured to receive the preamble sent by the UE on the second carrier.

Optionally, in a possible implementation of the sixth aspect, the apparatus further includes:

a transmitter, configured to send a response message to the UE, where the response information includes the TA of the second carrier and/or a random access power offset.

Optionally, in a possible implementation of the sixth aspect, the processor is further configured to:

determine the TA based on receiving information about the preamble.

Optionally, in a possible implementation of the sixth aspect, the indication message includes: a synchronization signal and/or a synchronization difference between base stations.

Optionally, in a possible implementation of the sixth aspect, the processor is further configured to:

send the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, and a TA of the third carrier.

Optionally, in a possible implementation of the sixth aspect, the processor is further configured to:

send the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, the synchronization difference between the base stations, and a TA of the third carrier.

Optionally, in a possible implementation of the sixth aspect, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

Optionally, in a possible implementation of the sixth aspect, the transmitter is further configured to:

send the indication message to the UE by using the second carrier.

Optionally, in a possible implementation of the sixth aspect, the transmitter is further configured to:

send the response message to the UE by using the second carrier.

Optionally, in a possible implementation of the sixth aspect, the indication message further includes: a number of a fourth carrier or a number of a first carrier.

Optionally, in a possible implementation of the sixth aspect, the transmitter is further configured to:

send the response message to the UE by using the fourth carrier or the first carrier.

Optionally, in a possible implementation of the sixth aspect, the indication information is Radio Resource Control RRC signaling or physical layer signaling.

Optionally, in a possible implementation of the sixth aspect, the transmitter is further configured to:

send a physical downlink control channel PDCCH command to the UE.

Optionally, in a possible implementation of the sixth aspect, the transmitter is further configured to:

send a response message to the UE, so that the UE determines the TA of the second carrier based on a difference between the TA of the second carrier and a TA of a first carrier, and the TA of the first carrier, where the response information includes the difference between the TA of the second carrier and the TA of the first carrier.

Optionally, in a possible implementation of the sixth aspect, the indication message further includes: type information of the response message and/or information about a time segment of the response message.

Optionally, in a possible implementation of the sixth aspect, the transmitter is further configured to:

send the response message to the UE, so that the UE receives the response message in the time segment.

Optionally, in a possible implementation of the sixth aspect, the transmitter is further configured to:

send the response message to the UE, so that the UE parses the response message based on the type information of the response message.

For beneficial effects of the TA obtaining apparatus provided in the sixth aspect and the possible implementations of the sixth aspect, refer to beneficial effects of the first aspect and the possible implementations of the first aspect. Details are not described herein again.

Embodiments of the present invention provide a TA obtaining method and apparatus. The method includes: generating, by a base station, an indication message and sending the indication message to UE, and receiving, by the UE, the indication message sent by the base station and obtaining a timing advance TA of a second carrier based on the indication message, where the second carrier is a carrier not used to transmit a PUSCH. In this way, although the second carrier is a carrier not used to transmit a PUSCH, the TA of the second carrier can still be obtained.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

A TA obtaining method and apparatus provided in the embodiments of the present invention may be applied to a network architecture of an LTE system, or may be applied to a network architecture of a next-generation (4.5G or 5G) communications system.

Figure 1:
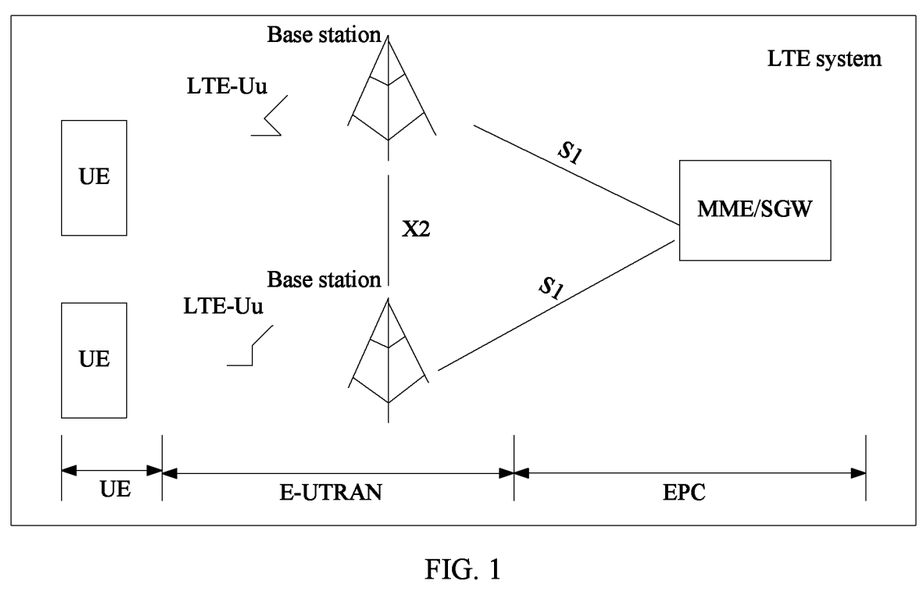
FIG. 1 is a schematic diagram of an architecture of an LTE system according to an embodiment of the present invention.

FIG. 1 is a schematic diagram of an architecture of an LTE system according to an embodiment of the present invention. As shown in FIG. 1, an LTE system is used as an example. The LTE system includes UE, an evolved Node B (Evolved Node B, eNodeB for short), and an evolved packet core (Evolved Packet Core, EPC for short). The EPC is responsible for a core network part, a mobility management entity (Mobility Management Entity, MME for short) is responsible for signaling processing, a serving gateway (Serving Gateway, S-GW for short) is responsible for data processing, and the eNodeB is responsible for an access network part that is also referred to as an evolved UMTS terrestrial radio access network (evolved UTRAN, evolved UTRAN). The LTE system supports interoperation with another 3GPP system. Based on different duplexing manners, LTE systems are classified into a frequency division duplexing LTE system (Frequency Division Duplexing-LTE, FDD-LTE for short) and a time division duplexing LTE system (Time Division Duplexing-LTE, TDD-LTE for short).

A terminal provided in this embodiment of the present invention may be a wireless terminal such as a mobile phone or a tablet computer. The wireless terminal includes a device providing a voice and/or data service to a user. The terminal may further be a handheld device, an in-vehicle device, a wearable device, and a computing device having a wireless connection function, and various user equipments UEs, mobile stations (Mobile Station, MS for short), and terminals (terminal). This is not limited in this embodiment of the present invention.

A base station in this embodiment of the present invention may be any device managing a radio network resource in an LTE communications network and a subsequent evolved communications network. For example, the base station may be an evolved Node B eNB in LTE, and may further be a wireless transceiver device (NeXt Node, NX for short) in 5G. This is not limited in this embodiment of the present invention.

The embodiments of the present invention provide a TA obtaining method and apparatus, to resolve a current prior-art technical problem that if a CC corresponding to UE is a CC not used to transmit a PUSCH, that is, random access cannot be performed on the CC, a TA based on which the UE sends an uplink signal on the CC cannot be obtained.

Specific embodiments are used below to describe the technical solutions of the present invention in detail. The following several specific embodiments may be combined with each other, and a same or similar concept or process may not be described repeatedly in some embodiments. Persons skilled in the art can clearly understand that for the embodiments of the present invention, refer to each other. For ease of concise descriptions, for specific working processes of the devices described above and modules or units in the devices, and a working process of a communications system including the devices described above, refer to descriptions of corresponding processes in the method embodiments.

Figure 2:
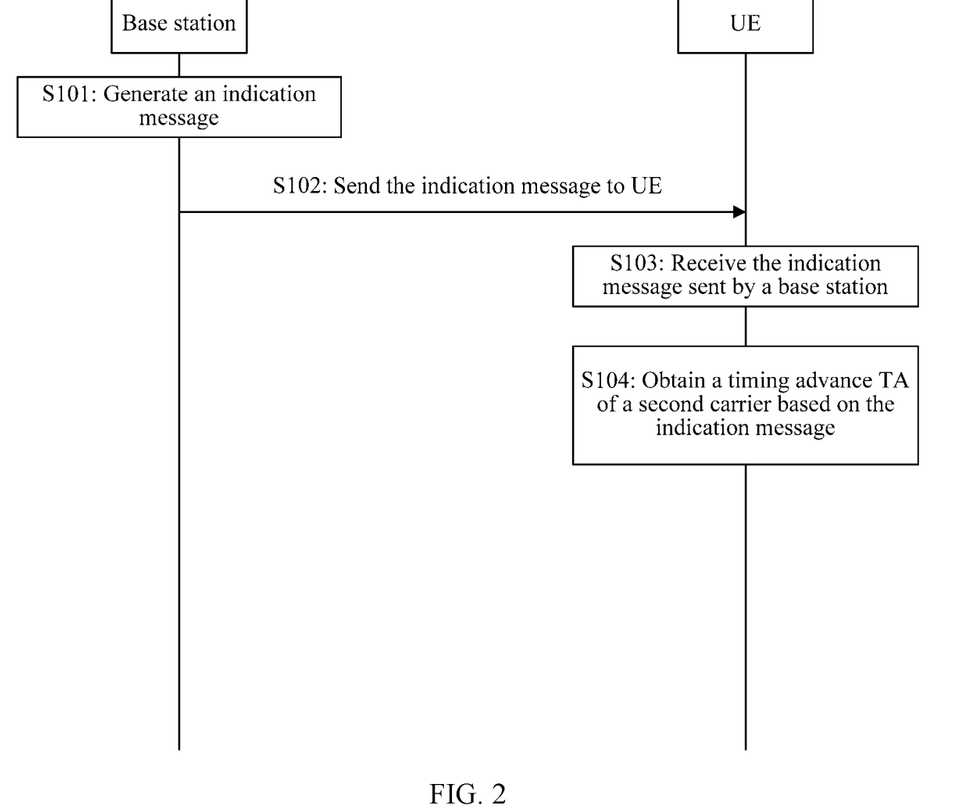
FIG. 2 is a signaling flowchart of Embodiment 1 of a TA obtaining method according to an embodiment of the present invention.

FIG. 2 is a signaling flowchart of Embodiment 1 of a TA obtaining method according to an embodiment of the present invention. A RACH on a CC not used to transmit a PUSCH is configured on an uplink CC, to obtain a required TA. As shown in FIG. 2, the TA obtaining method provided in this embodiment of the present invention includes the following steps.

S101: A base station generates an indication message.

In a possible implementation, when UE needs to switch from a first carrier to a second carrier, the base station generates the indication message.

In another possible implementation, when the base station needs to send uplink data, for example, send an SRS by using the second carrier, the base station generates the indication message.

In this embodiment of the present invention, the indication message may have a plurality of implementations. This is not limited in this embodiment of the present invention.

In a possible implementation, the indication message includes a preamble and a resource transmission identifier that needs to be transmitted on the second carrier.

In this embodiment of the present invention, the base station may send the indication message to the UE, so that the UE performs random access based on the indication message.

In another possible implementation, the indication message includes: a synchronization signal and/or a synchronization difference between base stations.

In this embodiment of the present invention, the base station may send the indication message to the UE, so that the UE measures a difference between receiving times of the synchronization signal based on the indication message.

In addition, it should be noted that the indication information may be Radio Resource Control RRC signaling or physical layer signaling.

S102: The base station sends the indication message to UE.

In a possible implementation, the base station sends the indication message by using the first carrier.

In another possible implementation, the base station sends the indication message by using the second carrier.

It should be noted that the first carrier is a carrier from which switching is performed, and the second carrier is a carrier to which switching is performed.

S103: The UE receives the indication message sent by the base station.

S104: The UE obtains a timing advance TA of a second carrier based on the indication message, where the second carrier is a carrier not used to transmit a PUSCH.

The TA obtaining method provided in this embodiment of the present invention includes: generating, by the base station, the indication message and sending the indication message to the UE, and receiving, by the UE, the indication message sent by the base station and obtaining the timing advance TA of the second carrier based on the indication message, where the second carrier is a carrier not used to transmit a PUSCH. In this way, although the second carrier is a carrier not used to transmit a PUSCH, the TA of the second carrier can still be obtained.

Figure 3:
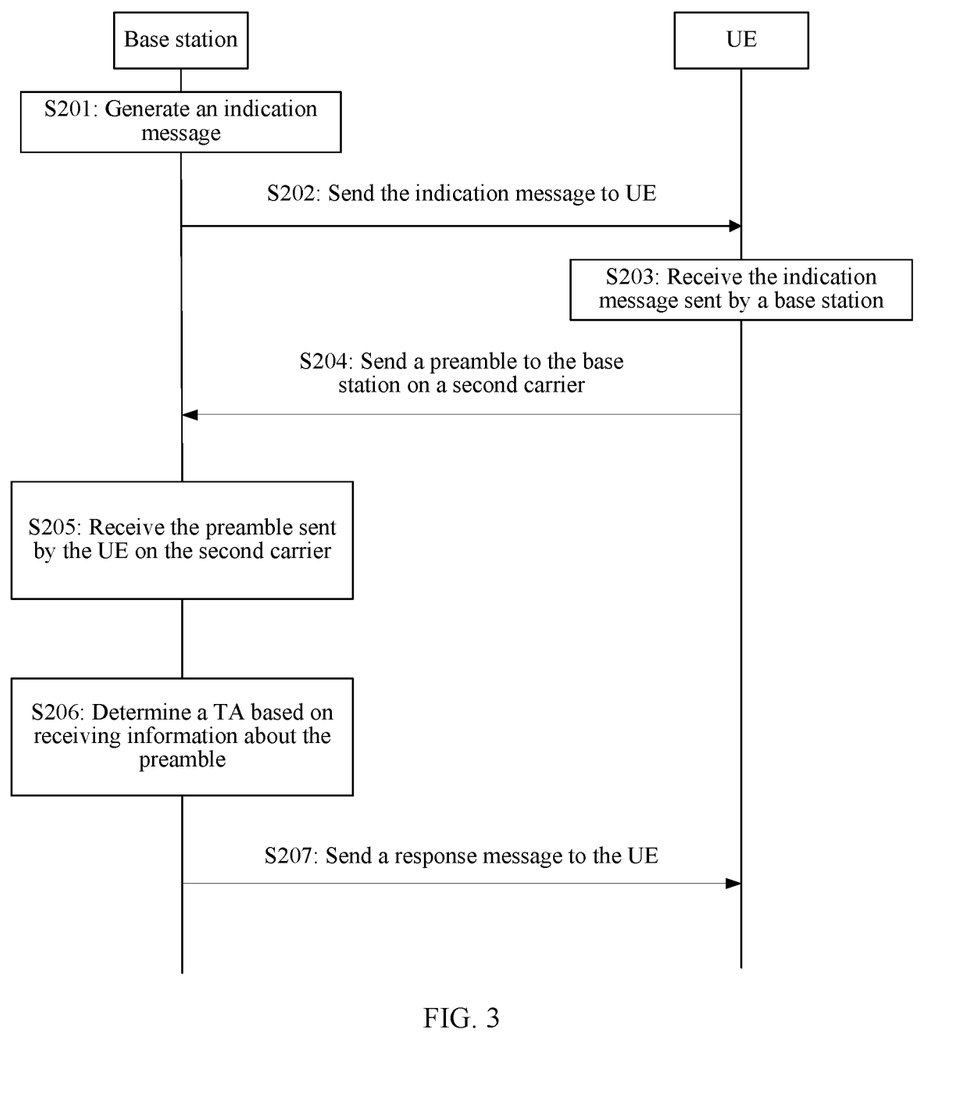
FIG. 3 is a signaling flowchart of Embodiment 2 of a TA obtaining method according to an embodiment of the present invention.

FIG. 3 is a signaling flowchart of Embodiment 2 of a TA obtaining method according to an embodiment of the present invention. As shown in FIG. 3, based on the embodiment shown in FIG. 2, the TA obtaining method provided in this embodiment of the present invention includes the following steps.

S201: A base station generates an indication message.

In a possible implementation, the indication message includes a preamble and/or a resource transmission identifier that needs to be transmitted on a second carrier.

Specifically, the resource transmission identifier includes any one of a subframe identifier, an orthogonal frequency division multiplexing OFDM symbol location identifier, a carrier identifier, and a physical resource block identifier.

The subframe identifier is used to indicate a subframe in which the UE sends the preamble on the second carrier.

The OFDM symbol location identifier is used to indicate an OFDM symbol location in which the preamble sent by the UE on the second carrier is transmitted.

The physical resource block identifier is used to indicate a physical resource block of the second carrier on which the UE sends the preamble and a subframe in which the UE sends the preamble.

The carrier identifier is used to instruct the UE to receive, on a carrier corresponding to the carrier identifier, a response message sent by the base station.

In another possible implementation, the indication message includes a preamble and/or resource transmission that needs to be transmitted on the second carrier and a number of a fourth carrier or a number of a first carrier.

It should be noted that the number of the fourth carrier or the number of the first carrier is used to indicate to the UE that after the UE performs random access by using the preamble, the UE needs to receive a random access response message on the fourth carrier or the first carrier.

In still another possible implementation, the indication message includes a preamble and/or resource transmission that needs to be transmitted on the second carrier, and/or type information of the response message and/or information about a time segment of the response message, and a number of a fourth carrier or a number of a first carrier.

It should be noted that the type information of the response message and/or the information about the time segment of the response message is used to notify the UE of a type of the response message and/or the time segment in which the response message is sent, so that the UE receives, in the time segment, the response message sent by the base station, and/or the UE parses the response message based on the type of the response message.

In addition, optionally, a new preamble group message is preconfigured in the base station. The preamble group may be broadcast to the UE by using broadcast signaling. Therefore, the base station may select any preamble from the preamble group based on the preamble group message and add the preamble to the indication message. The preamble group message includes the preamble group. A response message format implicitly corresponding to each preamble in the preamble group may be preconfigured for the UE. In addition, the preamble group is a preamble set designed for a carrier not used to transmit a PUSCH. Because the UE has learned of the preamble group message by using preconfiguration, when instructing the UE to use a preamble in the preamble group, the base station does not need to notify the UE of the type of the response message, and the UE may obtain, based on the preconfigured preamble group information, the type of the response message replied by the base station.

When a plurality of UEs need to perform SRS switching transmission in a same subframe on the second carrier, the base station selects different preambles in the preamble group to configure the RACH to obtain a TA, or configure a plurality of different RACH time domain and/or frequency domain resources to configure the RACH to obtain a TA. The foregoing RACH process is based on a non-contention based RACH. The random access response message does not include an uplink grant and a cell radio network temporary identifier C-RNTI (cell radio network temporary identifier).

Optionally, the preamble in the indication message is a short preamble. For example, the preamble is a preamble specified in a format 4 in the prior art.

S202: The base station sends the indication message to UE.

S203: The UE receives the indication message sent by the base station.

S204: The UE sends a preamble to the base station on a second carrier.

In a possible implementation, the UE sends the preamble in a subframe corresponding to the subframe identifier of the second carrier. The indication message received by the UE includes the subframe identifier.

In another possible implementation, the UE adds the preamble to the OFDM symbol location corresponding to the OFDM symbol location identifier, and sends the preamble in the OFDM symbol location corresponding to the second carrier. The indication message received by the UE includes the OFDM symbol location identifier.

In still another possible implementation, the UE transmits the preamble on the physical resource block corresponding to the physical resource block identifier of the second carrier. The indication message received by the UE includes the physical resource block identifier.

It should be noted that the UE sends the preamble based on the indication message sent by the base station. To be specific, the UE performs random access in a non-contention based manner.

In addition, it should be noted that when receiving the indication message, the UE does not immediately send the preamble, and may send the preamble based on a preamble sending time specified in the indication message. Alternatively, the base station may send a downlink control channel (Physical Downlink Control Channel, PDCCH for short) command to the UE to trigger the UE to send the preamble.

Step 205: The base station receives the preamble sent by the UE on the second carrier.

Step 206: The base station determines a TA based on receiving information about the preamble.

Specifically, the base station determines a TA value based on a preamble receiving time and the received preamble.

Step 207: The base station sends a response message to the UE, where the response information includes a TA of the second carrier and/or a random access power offset.

In a possible implementation, the response message is a new random access response message formed by modifying a valid payload of a random access response.

It should be noted that when the TA is carried only in a valid payload of the existing random access response message, the random access response message is a new random response message.

In another possible implementation, the response message is a timing advance Media Access Control control element (Timing advance Media Access Control Control Element, TA MAC CE for short) newly explained.

Specifically, a reserved bit of the TA MAC CE may be used to carry the TA.

In still another possible implementation, the response message is a new random access response message formed by modifying a frame format of a random access response.

Specifically, a bit of a subheader of a flag field of the random access response may be used to carry a timing advance control element (Timing Advance Control Element, TA CE for short), and the TA CE carries the TA.

In yet another possible implementation, the response message is a random access response message.

It should be noted that the random access response message is an existing random access response message.

In yet another possible implementation, the response message is a Media Access Control control element (Media Access Control Control Element, MAC CE for short).

It should be noted that the MAC CE is an existing MAC CE, and the MAC CE carries the TA.

In addition, it should be noted that when the UE transmits the preamble based on path loss estimation and the random access power offset, after receiving the preamble, the base station determines a random access power offset of the UE based on a signal strength value and a target power value of the actually received preamble, and sends the random access power offset to the UE by using the response information.

Further, to reduce overheads of the response message, the response message includes a difference between the TA of the second carrier and a TA of the first carrier.

Correspondingly, the UE may determine the TA of the second carrier based on the difference between the TA of the second carrier and the TA of the first carrier, and the TA of the first carrier.

Figure 4:
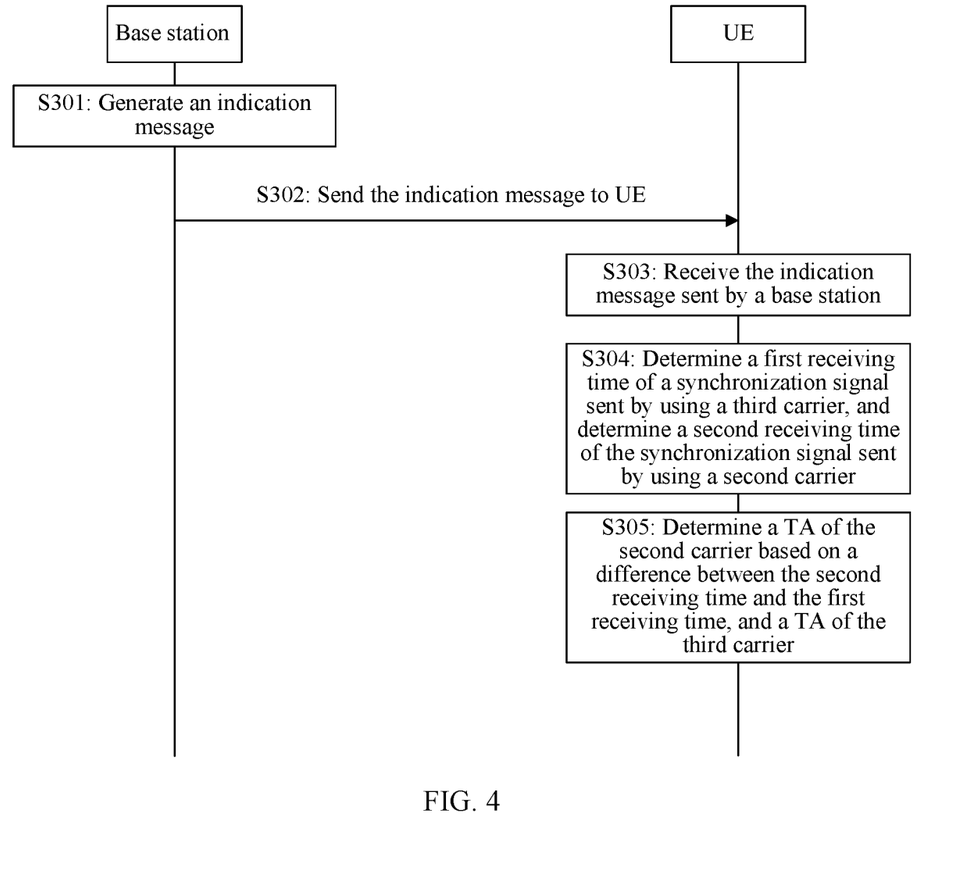
FIG. 4 is a signaling flowchart of Embodiment 3 of a TA obtaining method according to an embodiment of the present invention.

FIG. 4 is a signaling flowchart of Embodiment 3 of a TA obtaining method according to an embodiment of the present invention. As shown in FIG. 4, based on the embodiment shown in FIG. 2, the TA obtaining method provided in this embodiment of the present invention includes the following steps.

S301: A base station generates an indication message.

In this embodiment of the present invention, the indication information includes a synchronization signal, and a second carrier and a third carrier are managed by a same base station.

It should be noted that the second carrier and the third carrier belong to different TAGs, that is, a TA of the second carrier is different from a TA of the third carrier, and the TA of the third carrier is already known. The third carrier is a carrier used to transmit a PUSCH. To be specific, random access may be performed on the third carrier based on the prior art, to obtain the TA of the third carrier.

Optionally, the third carrier and a first carrier are same carriers. To be specific, the third carrier is a carrier from which switching is performed, and the second carrier is a carrier to which switching is performed.

S302: The base station sends the indication message to UE.

In this embodiment of the present invention, the base station sends the indication message to the UE by using the second carrier and the third carrier.

S303: The UE receives the indication message sent by the base station.

S304: The UE determines a first receiving time of a synchronization signal sent by using a third carrier, and determines a second receiving time of the synchronization signal sent by using a second carrier.

S305: The UE determines a TA of the second carrier based on a difference between the second receiving time and the first receiving time, and a TA of the third carrier.

In this embodiment of the present invention, for example, the difference between the second receiving time and the first receiving time is $t_1$, and the TA of the third carrier is $t_2$. In this case, the TA of the second carrier is $t_1+t_2$.

In addition, the TA of the second carrier is a downlink TA. However, in consideration of channel reciprocity, that is, a feature of an uplink channel is basically the same as that of a downlink channel, values of an uplink TA and the downlink TA of the second carrier are the same, and may not be distinguished. Therefore, the downlink TA of the second carrier may be used as the uplink TA based on which an uplink signal is sent on the second carrier, where the uplink signal may be an SRS.

Figure 5:
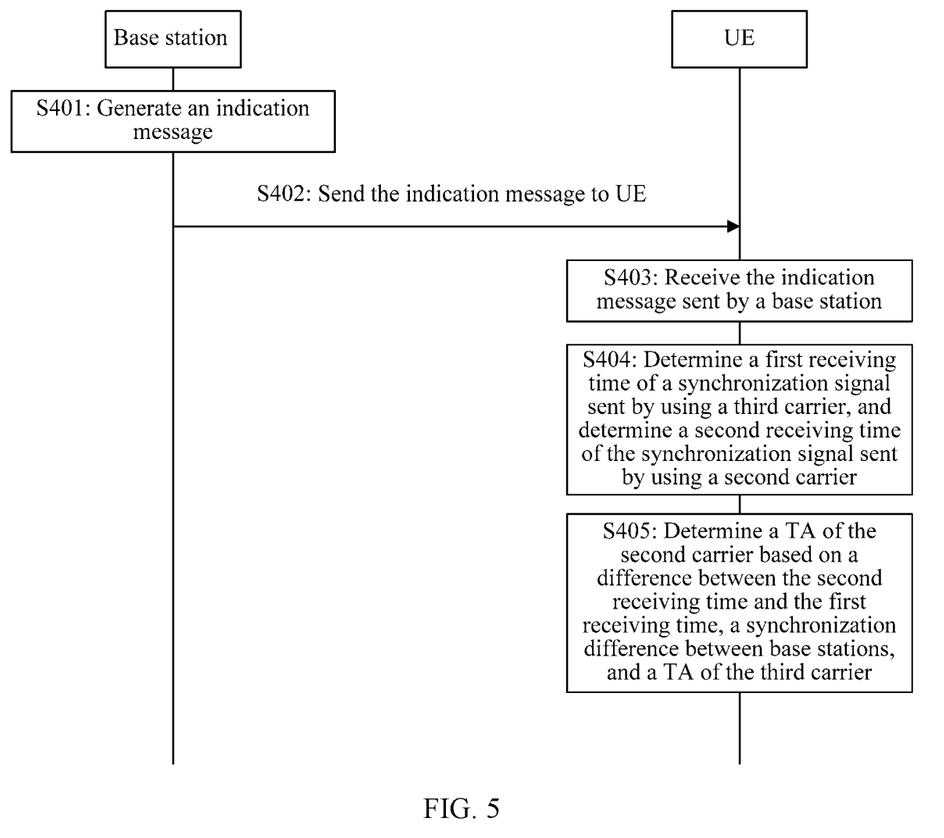
FIG. 5 is a signaling flowchart of Embodiment 4 of a TA obtaining method according to an embodiment of the present invention.

FIG. 5 is a signaling flowchart of Embodiment 4 of a TA obtaining method according to an embodiment of the present invention. As shown in FIG. 5, based on the embodiment shown in FIG. 2, the TA obtaining method provided in this embodiment of the present invention includes the following steps.

S401: A base station generates an indication message.

In this embodiment of the present invention, the indication information includes a synchronization signal and a synchronization difference between base stations, and a second carrier and a third carrier are respectively managed by different base stations. For example, the second carrier is managed by a first base station, and the third carrier is managed by a second base station.

It should be noted that the second carrier and the third carrier belong to different TAGs, that is, a TA of the second carrier is different from a TA of the third carrier, and the TA of the third carrier is already known. The third carrier is a carrier used to transmit a PUSCH. To be specific, random access may be performed on the third carrier based on the prior art, to obtain the TA of the third carrier.

S402: The base station sends the indication message to UE.

Specifically, the first base station sends the indication message to the UE by using the second carrier, and the second base station sends the indication message to the UE by using the third carrier.

It should be noted that the first base station and the second base station respectively send the indication message at a same moment. However, because timing systems of the first base station and the second base station are different, there is a synchronization difference between the first base station and the second base station.

S403: The UE receives the indication message sent by the base station.

S404: The UE determines a first receiving time of a synchronization signal sent by using a third carrier, and determines a second receiving time of the synchronization signal sent by using a second carrier.

S405: The UE determines a TA of the second carrier based on a difference between the second receiving time and the first receiving time, a synchronization difference between base stations, and a TA of the third carrier.

In this embodiment of the present invention, for example, the difference between the second receiving time and the first receiving time is $t_1$, the TA of the third carrier is $t_2$, and the synchronization difference between the first base station and the second base station is $t_3$. In this case, the TA of the second carrier is $t_1+t_2 \pm t_3$.

In addition, the TA of the second carrier is a downlink TA. However, in consideration of channel reciprocity, that is, a feature of an uplink channel is basically the same as that of a downlink channel, values of an uplink TA and the downlink TA of the second carrier are the same, and may not be distinguished. Therefore, the downlink TA of the second carrier may be used as the uplink TA based on which an uplink signal is sent on the second carrier, where the uplink signal may be an SRS.

Figure 6:
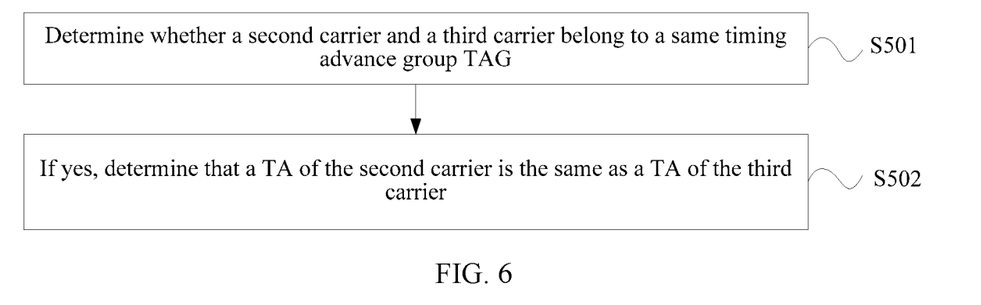
FIG. 6 is a method flowchart of Embodiment 5 of a TA obtaining method according to an embodiment of the present invention.

FIG. 6 is a method flowchart of Embodiment 4 of a TA obtaining method according to an embodiment of the present invention. As shown in FIG. 6, the TA obtaining method provided in this embodiment of the present invention includes the following steps:

S501: Determine whether a second carrier and a third carrier belong to a same timing advance group TAG, where the second carrier is a carrier not used to transmit a PUSCH.

In a possible implementation, when UE needs to switch from a first carrier to the second carrier, a base station generates an indication message.

In another possible implementation, when the base station needs to send uplink data, for example, send an SRS by using the second carrier, the base station generates the indication message.

S502: If yes, determine that a TA of the second carrier is the same as that of the third carrier.

The TA obtaining method provided in this embodiment of the present invention includes: determining whether the second carrier and the third carrier belong to a same timing advance group TAG, where the second carrier is a carrier not used to transmit a PUSCH; and if yes, determining that the TA of the second carrier is the same as the TA of the third carrier. In this way, although the second carrier is a carrier not used to transmit a PUSCH, the TA of the second carrier can still be obtained.

Optionally, the third carrier and the first carrier are same carriers. To be specific, the third carrier is a carrier from which switching is performed.

Optionally, the third carrier and the first carrier are different, and the third carrier is an uplink carrier. To be specific, for the third carrier, the TA of the third carrier may be obtained by using an existing physical layer random access technology.

It should be noted that after the TA of the second carrier is determined, an uplink signal is sent on the second carrier based on the TA of the second carrier. For example, the uplink signal is an SRS.

Figure 7:
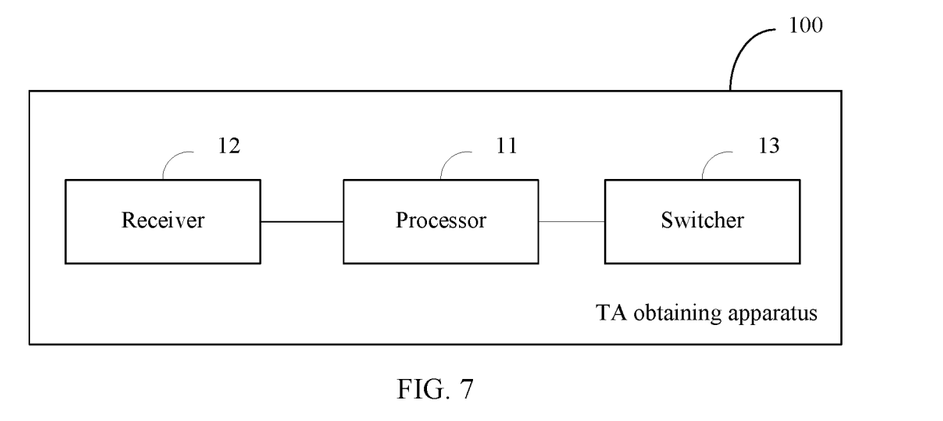
FIG. 7 is a schematic structural diagram of Embodiment 1 of a TA obtaining apparatus according to an embodiment of the present invention.

FIG. 7 is a schematic structural diagram of Embodiment 1 of a TA obtaining apparatus according to an embodiment of the present invention. As shown in FIG. 7, the apparatus 100 includes: a receiver 12 and a processor 11.

The receiver 12 is configured to receive an indication message sent by a base station.

The processor 11 is configured to obtain a timing advance TA of a second carrier based on the indication message, where the second carrier is a carrier not used to transmit a PUSCH.

Further, still referring to FIG. 7, the apparatus 100 further includes:

a switcher 13, configured to switch from a first carrier to the second carrier.

Optionally, the indication message includes a preamble and/or a resource transmission identifier that needs to be transmitted on the second carrier.

Optionally, the resource transmission identifier includes at least one of the following: a subframe identifier, an orthogonal frequency division multiplexing OFDM symbol location identifier, a carrier identifier, and a physical resource block identifier.

Optionally, the processor 11 is specifically configured to send the preamble to the base station on the second carrier.

In a possible implementation, the processor 11 is specifically configured to receive a response message sent by the base station, where the response information includes the TA of the second carrier and/or a random access power offset.

Further, the TA is determined by the base station based on receiving information about the preamble.

Optionally, the indication message includes: a synchronization signal and/or a synchronization difference between base stations.

In a possible implementation, the processor 11 is specifically configured to: determine a first receiving time of the synchronization signal sent by using the third carrier, and determine a second receiving time of the synchronization signal sent by using the second carrier.

In another possible implementation, the processor 11 is specifically configured to determine the TA of the second carrier based on a difference between the second receiving time and the first receiving time, and a TA of the third carrier.

Further, the TA of the second carrier is a downlink TA.

Optionally, the downlink TA is used as an uplink TA based on which an uplink signal is sent on the second carrier.

Further, the indication message includes: a synchronization signal and/or a synchronization difference between base stations.

Optionally, the processor 11 is specifically configured to: determine a first receiving time of the synchronization signal sent by using the third carrier, and determine a second receiving time of the synchronization signal sent by using the second carrier.

In a possible implementation, the processor 11 is specifically configured to determine the TA of the second carrier based on a difference between the second receiving time and the first receiving time, the synchronization difference between the base stations, and a TA of the third carrier.

Optionally, the third carrier and the first carrier are same carriers.

Optionally, the first carrier and the second carrier are in different timing advance groups TAGs.

Optionally, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

In a possible implementation, the receiver 12 is specifically configured to receive the indication message sent by using the second carrier.

In another possible implementation, the processor 11 is specifically configured to receive the response message sent by the base station by using the second carrier.

Optionally, the indication message further includes: a number of a fourth carrier or a number of the first carrier.

In a possible implementation, the processor 11 is specifically configured to receive, on the fourth carrier or the first carrier, the response message sent by the base station.

Optionally, the indication information is Radio Resource Control RRC signaling or physical layer signaling.

In a possible implementation, the processor 11 is specifically configured to receive a physical downlink control channel PDCCH command sent by the base station.

In another possible implementation, the processor 11 is specifically configured to receive a response message sent by the base station, where the response information includes a difference between the TA of the second carrier and a TA of the first carrier.

In still another possible implementation, the processor is specifically configured to determine the TA of the second carrier based on the difference between the TA of the second carrier and the TA of the first carrier, and the TA of the first carrier.

Optionally, the indication message further includes: type information of the response message and/or information about a time segment of the response message.

Optionally, the processor 11 is specifically configured to receive, in the time segment, the response message sent by the base station.

Optionally, the processor 11 is specifically configured to parse the response message based on the type information of the response message.

Figure 8:
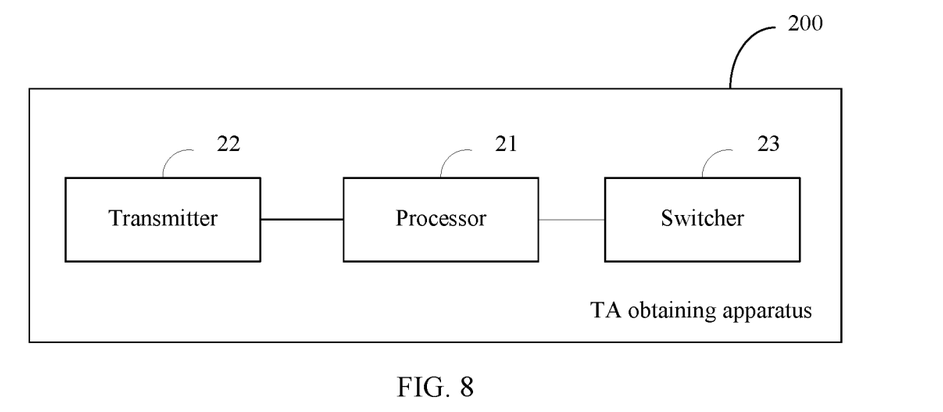
FIG. 8 is a schematic structural diagram of Embodiment 2 of a TA obtaining apparatus according to an embodiment of the present invention.

FIG. 8 is a schematic structural diagram of Embodiment 2 of a TA obtaining apparatus according to an embodiment of the present invention. As shown in FIG. 8, the apparatus 200 includes: a processor 21.

The processor 21 is configured to determine whether a second carrier and a third carrier belong to a same timing advance group TAG, where the second carrier is a carrier not used to transmit a PUSCH.

If yes, the processor is further configured to determine that a TA of the second carrier is the same as that of the third carrier.

Further, still referring to FIG. 8, the apparatus 200 further includes: a transmitter 22, configured to send an uplink signal on the second carrier based on the TA of the second carrier.

Optionally, the uplink signal is a sounding reference signal SRS.

In a possible implementation, the apparatus 200 further includes:

a switcher 23, configured to switch from a first carrier to the second carrier.

Optionally, the third carrier and the first carrier are same carriers.

Optionally, the third carrier is different from the first carrier, and the third carrier is an uplink carrier.

Figure 9:
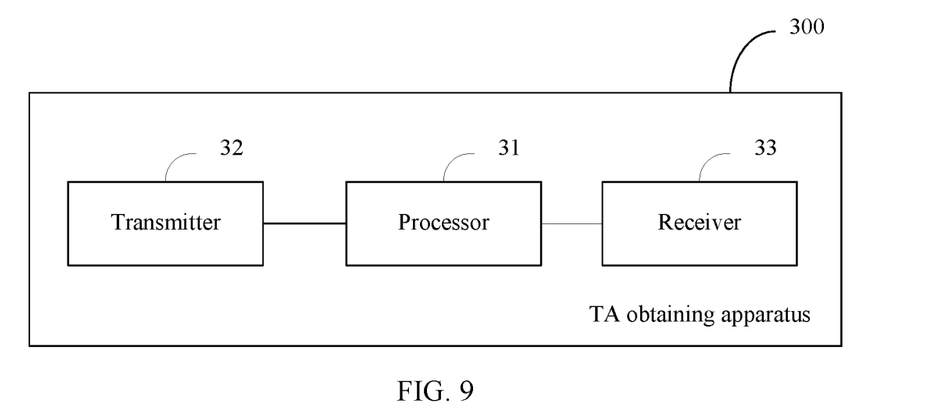
FIG. 9 is a schematic structural diagram of Embodiment 2 of a TA obtaining apparatus according to an embodiment of the present invention.

FIG. 9 is a schematic structural diagram of Embodiment 2 of a TA obtaining apparatus according to an embodiment of the present invention. As shown in FIG. 9, the apparatus 300 includes: a processor 31 and a transmitter 32.

The processor 31 is configured to generate an indication message, where the indication message is used to instruct user equipment UE to obtain a timing advance TA.

The transmitter 32 is configured to send the indication message to the UE.

Optionally, the indication message includes a preamble and a resource transmission identifier that needs to be transmitted on the second carrier.

Optionally, the resource transmission identifier includes at least one of the following: a subframe identifier, an orthogonal frequency division multiplexing OFDM symbol location identifier, a carrier identifier, and a physical resource block identifier.

In a possible implementation, the apparatus 300 further includes:

a receiver 33, configured to receive the preamble sent by the UE on the second carrier.

The transmitter 32 is configured to send a response message to the UE, where the response information includes the TA of the second carrier and/or a random access power offset.

Optionally, the processor 31 is further configured to determine the TA based on receiving information about the preamble.

Optionally, the indication message includes: a synchronization signal and/or a synchronization difference between base stations.

Optionally, the processor 31 is further configured to:

send the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, and a TA of the third carrier.

Optionally, the processor 31 is further configured to:

send the synchronization signal to the UE separately by using a third carrier and the second carrier, so that the UE determines the TA of the second carrier based on a difference between a first receiving time at which the synchronization signal is received on the third carrier and a second receiving time at which the synchronization signal is received on the second carrier, the synchronization difference between the base stations, and a TA of the third carrier.

Optionally, the response message is a new random access response message formed by modifying a valid payload of a random access response, or a timing advance Media Access Control control element TA MAC CE newly explained, or a TA MAC CE, or a new random access response message formed by modifying a frame format of a random access response, or an existing Media Access Control control element MAC CE, or a random access response.

Optionally, the transmitter 32 is further configured to:

send the indication message to the UE by using the second carrier.

Optionally, the transmitter is further configured to:

send the response message to the UE by using the second carrier.

Optionally, the indication message further includes: a number of a fourth carrier or a number of a first carrier.

Optionally, the transmitter is further configured to:

send the response message to the UE by using the fourth carrier or the first carrier.

Optionally, the indication information is Radio Resource Control RRC signaling or physical layer signaling.

Optionally, the transmitter 32 is further configured to:

send a physical downlink control channel PDCCH command to the UE.

Optionally, the transmitter 32 is further configured to:

send a response message to the UE, so that the UE determines the TA of the second carrier based on a difference between the TA of the second carrier and a TA of a first carrier, and the TA of the first carrier, where the response information includes the difference between the TA of the second carrier and the TA of the first carrier.

Optionally, the indication message further includes: type information of the response message and/or information about a time segment of the response message.

Optionally, the transmitter 32 is further configured to:

send the response message to the UE, so that the UE receives the response message in the time segment.

Optionally, the transmitter 32 is further configured to:

send the response message to the UE, so that the UE parses the response message based on the type information of the response message.

For the apparatus in the foregoing embodiment, specific manners of executing operations by each module are described in detail in the embodiments related to the method, and details are not described herein.

Persons skilled in the art can clearly understand that for the embodiments of the present invention, refer to each other. For ease of concise descriptions, for specific working processes of the devices described above and modules or units in the devices, and a working process of a communications system including the devices described above, refer to descriptions of corresponding processes in the method embodiments.

Based on the foregoing descriptions of the embodiments, persons skilled in the art may clearly understand that the present invention may be implemented by software in addition to a necessary universal hardware platform or by hardware only. In most circumstances, the former is a preferred implementation. Based on such an understanding, the technical solutions of the present invention essentially, or the part contributing to the prior art may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, device, and method may be implemented in other manners. For example, the base station embodiments described above are merely examples. For example, the module or unit division is merely logical function division and there may be other division manners in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. Persons of ordinary skill in the art may understand and implement the embodiments of the present invention without creative efforts.

In addition, the described systems, devices, and methods and schematic diagrams of different embodiments may be combined or integrated with other systems, modules, technologies, or methods without departing from the scope of this application. In addition, the displayed or discussed mutual couplings or direct couplings or communication connections may be implemented through some interfaces. The indirect couplings or communication connections between the base stations or units may be implemented in electronic, mechanical, or other forms.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A Timing Advance (TA) obtaining method, comprising:
receiving an indication message sent by a base station, wherein the indication message comprises at least one of a synchronization signal or a synchronization difference between base stations; and
obtaining a TA of a second carrier based on the indication message, wherein the second carrier is a carrier not used to transmit a physical uplink shared channel (PUSCH), and wherein obtaining the TA of the second carrier based on the indication message comprises:
determining a first receiving time of the synchronization signal sent by using a third carrier; and
determining a second receiving time of the synchronization signal sent by using the second carrier.

2. The method according to claim 1, wherein the method further comprises switching from a first carrier to the second carrier.

3. The method according to claim 1, wherein the indication message comprises at least one of a preamble or a resource transmission identifier that needs to be transmitted on the second carrier.

4. The method according to claim 3, wherein the resource transmission identifier comprises at least one of the following: a subframe identifier, an orthogonal frequency division multiplexing (OFDM) symbol location identifier, a carrier identifier, and a physical resource block identifier.

5. The method according to claim 3, wherein the obtaining a TA of a second carrier based on the indication message comprises:
sending the preamble to the base station on the second carrier.

6. The method according to claim 3, wherein the obtaining a TA of a second carrier based on the indication message comprises:
receiving a response message sent by the base station, wherein response information included in the response message comprises at least one of the TA of the second carrier or a random access power offset.

7. The method according to claim 3, wherein the TA is determined by the base station based on receiving information about the preamble.

8. The method according to claim 1, wherein the obtaining a TA of a second carrier based on the indication message comprises:
determining the TA of the second carrier based on a difference between the second receiving time and the first receiving time, and a TA of the third carrier.

9. A Timing Advance (TA) obtaining apparatus, comprising:
at least one processor, a receiver, and a non-transitory computer-readable storage medium coupled to the at least one processor and storing programming instructions for execution by the at least one processor, wherein:
the receiver is configured to receive an indication message sent by a base station, wherein the indication message comprises at least one of a synchronization signal or a synchronization difference between base stations; and
the programming instructions instruct the at least one processor to obtain a TA of a second carrier based on the indication message, wherein the second carrier is a carrier not used to transmit a physical uplink shared channel (PUSCH), and wherein obtaining the TA of the second carrier based on the indication message comprises:
determining a first receiving time of the synchronization signal sent by using a third carrier; and
determining a second receiving time of the synchronization signal sent by using the second carrier.

10. The apparatus according to claim 9, wherein the programming instructions instruct the at least one processor to switch from a first carrier to the second carrier.

11. The apparatus according to claim 9, wherein the indication message comprises at least one of a preamble or a resource transmission identifier that needs to be transmitted on the second carrier.

12. The apparatus according to claim 11, wherein the resource transmission identifier comprises at least one of the following: a subframe identifier, an orthogonal frequency division multiplexing (OFDM) symbol location identifier, a carrier identifier, and a physical resource block identifier.

13. The apparatus according to claim 11, wherein the programming instructions instruct the at least one processor to send the preamble to the base station on the second carrier.

14. The apparatus according to claim 11, wherein the programming instructions instruct the at least one processor to receive a response message sent by the base station, wherein response information included in the response message comprises at least one of the TA of the second carrier or a random access power offset.

15. The apparatus according to claim 11, wherein the TA is determined by the base station based on receiving information about the preamble.

16. The apparatus according to claim 9, wherein the programming instructions instruct the at least one processor to determine the TA of the second carrier based on a difference between the second receiving time and the first receiving time, and a TA of the third carrier.

* * * * *